J. M. BAURENS, Jr.
VALVE OPERATING MECHANISM.
APPLICATION FILED JUNE 6, 1917.

1,278,423.

Patented Sept. 10, 1918.

WITNESSES
J. H. Crawford
R. F. Miehle, Jr.

INVENTOR
J. M. Baurens, Jr.
BY Victor J. Evans
ATTORNEY

UNITED STATES PATENT OFFICE.

JEAN MARIE BAURENS, JR., OF PORT ARTHUR, TEXAS.

VALVE-OPERATING MECHANISM.

1,278,423.　　　　　　Specification of Letters Patent.　　Patented Sept. 10, 1918.

Application filed June 6, 1917. Serial No. 173,210.

*To all whom it may concern:*

Be it known that I, JEAN MARIE BAURENS, Jr., a citizen of the United States, residing at Port Arthur, in the county of Jefferson and State of Texas, have invented new and useful Improvements in Valve-Operating Mechanism, of which the following is a specification.

My invention relates to valve operating mechanism and has for its primary object to provide a simple and efficient means for operating a valve at a distance.

A further object of my invention is to provide a valve operating mechanism which can be easily attached to the valve stem of an ordinary valve.

A further object of the invention is to produce a guide revolubly mounted on the hub of a chain carrying sprocket wheel which is secured to the stem of the valve to be operated, said guide being in the nature of a casting and having a flanged hood at one of its ends arranged over the sprocket wheel for retaining the chain in engagement therewith and having its other end weighted and provided with a yoke through which the leads of the chain pass.

With these and other objects in view which will be hereinafter fully described and particularly pointed out in the claim, the invention consists in the novel construction and arrangement of parts illustrated in the accompanying drawings forming a part of this specification, in which:—

Like characters of reference indicate like parts in the various views.

Figure 1:
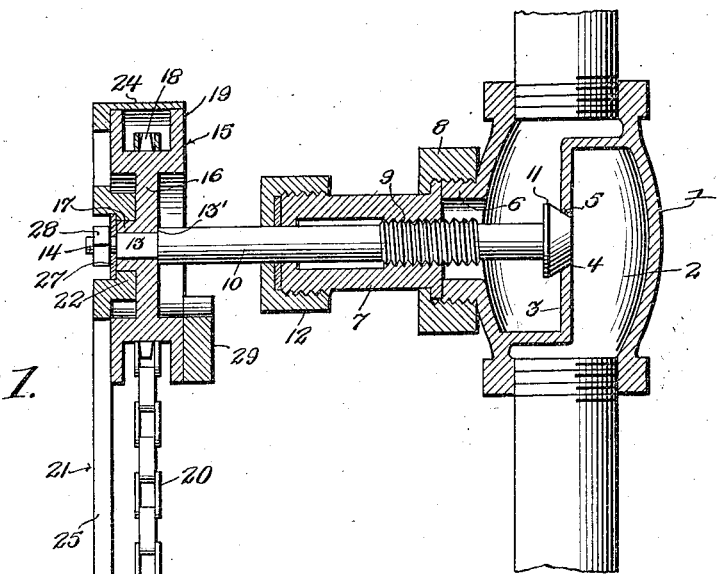
Figure 1 is a sectional side elevation of a valve to which an operating mechanism embodying my invention is attached.
Figure 2:
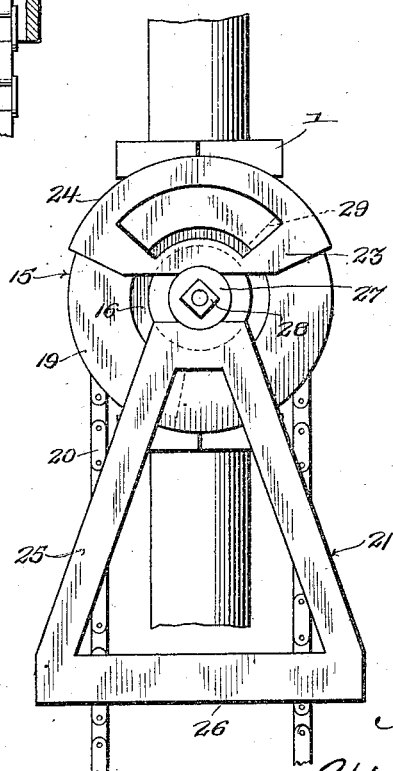
Fig. 2 is a front elevation of the same.

In the drawings 1 designates a valve body. The valve body has a passage 2 leading therethrough, and a partition 3 extends across said passage 2 and has an aperture 4 therein which connects portions of the passage lying above and below the partition. That portion of the partition 3 which has the aperture 4 therein lies parallel to the passage and has a valve seat 5 formed about the aperture 4. An apertured boss 6 is formed on the valve body in axial alinement with the valve seat 5, and a flanged sleeve 7 is secured on said boss by means of a nut 8, which is screw threaded upon the boss 6, clamping the flange of the sleeve against the end of the boss. The aperture of the sleeve 7 is disposed in axial alinement with the valve seat 5 and has screw threads 9 formed at the inner end thereof. A valve stem 10 is screw threaded into the screw threads 9, and has a valve 11, mounted at its inner end, which is adapted to engage the valve seat 5 when the stem is screwed to its inner position and to close the valve thereby. The stem 10 extends outwardly from the sleeve 7, the sleeve 7 having a packing nut 12 screw threaded upon its outer end to prevent leakage between the sleeve and valve stem. The stem 10 is formed angularly in cross section near its outer end, as designated at 13, the inner end of said angular portion having an outwardly facing shoulder 13′, and the extreme end thereof is screw threaded as designated at 14. The above described construction is well known to those skilled in the art and needs no further description for the present purposes except to say that all valves of this construction are usually provided with a hand wheel which engages the angular portion 13 and is secured thereon by means of a nut screwed threaded upon the screw threads 14.

15 designates a sprocket wheel which is provided with a centrally disposed angular aperture which is adapted to fit closely over the angular portion 13, the inner surface of the web 16 of the wheel abutting the shoulder 13′. A hub 17 projects from the outer face of the web, the combined thicknesses of the web and the hub being approximately equal to the length of the angular portion 13. Sprocket teeth 18 are formed upon the periphery of the wheel 15, and a circumferential flange 19 is formed upon said wheel upon each side of the teeth 18, said flanges being spaced from the teeth 18 so that a chain 20 may be trained over said sprocket wheel to engage the teeth of the same. 21 designates a guide member which is rotatably mounted upon the hub 17 by an offset apertured boss 22. The guide is in the nature of a casting, being constructed from a single piece of material. Arms 23 are formed upon the outer face of the boss of the guide member 21 and extend laterally, closely adjacent the outer flange 19, and support a transverse flange or hood 24, said transverse flange extending around the upper portion of the wheel 15 and lying closely adjacent the peripheries of the flanges 19, and the chain 20 is completely inclosed as it passes over the upper portion of the wheel 15. Arms 25 extend downwardly from the outer face of boss 22 and lie in a plane closely adjacent the outer flange 19, said arms 25 diverging from their upper ends and carrying at their outer ends a horizontally disposed bar in the nature of a yoke which provides a vertically disposed guide slot 26 which lies in the plane of the wheel 15, and through which the chain 20 passes. The yoke serves to restrict the chain laterally and also to prevent the chain from jumping out of the inclosure of the flanges 19 and retarding the rotation of the wheel thereby.

A washer 27 is mounted upon the screw threaded end 14 of the stem and engages the boss 22 to prevent it from working off of the hub 17, and a nut 28 is threaded upon the threaded end 14 and clamps said washer against said hub 17.

Secured upon the inner flange 19 of the sprocket wheel is a weight 29. This weight is preferably arcuate in form and lies closely adjacent the periphery of its flange, and is so disposed upon the wheel that when the valve is shut said weight tends to keep the valve in closed position against a jar or vibration which would otherwise open the valve.

In the preferred embodiment of my invention that portion of the guide member 21 which lies below the boss 22 is heavier than that portion which lies above the boss, and as a result the guide member tends to retain itself in proper working relation with chain 20 which hangs downwardly from the wheel 15.

Having thus fully described my invention, I claim:—

In a device for the purpose set forth, the combination with an adjustable valve carrying stem having a sprocket wheel provided with peripheral flanges secured on said stem, and a chain trained around said wheel between the flanges thereof, and said wheel having a hub upon its outer face, of a guide having a boss journaled on the hub, arms arranged in opposite pairs upon the outer face of the hub and pairs extending respectively upwardly and downwardly from the hub, a flange on the upper arms extending inwardly therefrom over the boss, said flange being arcuate and disposed over the flanges of the sprocket wheel to close the space between the said flanges of the sprocket wheel, the lower arms being of a greater length than the upper arms, a yoke formed on the outer ends of the lower arms, and through which the leads of the chain pass, and the lower portion of the guide, below the boss, being heavier than the portion thereof above the boss.

In testimony whereof I affix my signature.

JEAN MARIE BAURENS, Jr.

Copies of this patent may be obtained for five cents each, by addressing the "Commissioner of Patents, Washington, D. C."